United States Patent [19]

Roberts

[11] Patent Number: 4,623,131

[45] Date of Patent: Nov. 18, 1986

[54] MOLTEN METAL HANDLING VESSELS

[75] Inventor: Christopher T. Roberts, Birmingham, England

[73] Assignee: Foseco Trading A.G., Chur, Switzerland

[21] Appl. No.: 447,133

[22] Filed: Dec. 6, 1982

[30] Foreign Application Priority Data

Dec. 24, 1981 [GB] United Kingdom ............... 8138993

[51] Int. Cl.$^4$ ............................................. C21B 7/04
[52] U.S. Cl. .................................. 266/280; 266/286; 501/107
[58] Field of Search ............... 266/280, 281, 286, 284, 266/275; 264/30; 106/299; 501/107

[56] References Cited

U.S. PATENT DOCUMENTS

| | | | |
|---|---|---|---|
| 3,917,110 | 11/1975 | Kiguchi | 266/280 |
| 4,055,336 | 10/1977 | Massin | 266/275 |
| 4,194,730 | 3/1980 | Matsumoto et al. | 266/275 |

FOREIGN PATENT DOCUMENTS

| | | | |
|---|---|---|---|
| 2347909 | 3/1975 | Fed. Rep. of Germany | 266/286 |
| 7520831 | 4/1977 | France | 266/280 |
| 429367 | 5/1935 | United Kingdom . | |
| 462866 | 3/1937 | United Kingdom . | |
| 481769 | 3/1938 | United Kingdom . | |
| 535045 | 3/1941 | United Kingdom . | |
| 872759 | 7/1961 | United Kingdom . | |
| 1058344 | 2/1967 | United Kingdom . | |
| 1175991 | 1/1970 | United Kingdom . | |
| 1268826 | 3/1972 | United Kingdom . | |
| 1364665 | 8/1974 | United Kingdom . | |
| 1374493 | 11/1974 | United Kingdom . | |
| 1429723 | 3/1976 | United Kingdom . | |
| 1575124 | 9/1980 | United Kingdom . | |

*Primary Examiner*—L. Dewayne Rutledge
*Assistant Examiner*—S. Kastler
*Attorney, Agent, or Firm*—Nixon & Vanderhye

[57] ABSTRACT

A molten metal handling vessel has an inner, expendable, refractory, heat-insulating lining containing particulate zircon and a binder. The vessel may be used for handling molten ferrous metals e.g. steel, including high manganese steel. The inner lining may be in the form of a shaped article and the vessel may be a tundish for use in continuous casting.

5 Claims, No Drawings

MOLTEN METAL HANDLING VESSELS

This invention relates to molten metal handling vessels, to shaped refractory, heat-insulating articles for lining such vessels and to a method of casting.

A variety of vessels are used in handling molten metals. Examples of such vessels include tundishes, ladles and channels for molten metal transfer e.g. furnace spouts and launders.

In the continuous casting of metals, e.g. steel, molten metal is poured from a ladle into a continuous casting mould via an intermediate vessel which acts as a constant head reservoir and is called a tundish. The tundish has a metal floor and sidewalls and one or more outlet nozzles set in the floor or a sidewall. To protect the metal floor and walls of the tundish from the effects of molten metal it is usual to line the interior of the tundish with a relatively permanent lining, often made of bricks. The tundish may additionally be provided with an inner, expendable lining of refractory, heat-insulating slabs. This is described in British patent specification No. 1364665 and is highly advantageous.

Although the expendable lining described above is intended to be expendable, it must be able to survive satisfactorily for the duration of a cast and this may involve the passage of more than one ladleful of metal through the tundish, a practice known as sequence casting. The lining needs to withstand not only the temperature of the molten metal but also erosion by the metal and any slag associated with it.

In many circumstances expendable lining slabs of bonded silica particles are satisfactory in tundishes and the erosion-resistance of these slabs can be increased by inclusion of a proportion of carbonaceous matter such as graphite although this renders the slabs less heat-insulating. When the lining has to withstand particularly severe conditions, slabs of bonded calcined magnesite particles are often used but tend to be denser and have less good heat-insulating properties than silica-based slabs. Numerous particulate refractory materials other than silica and calcined magnesite have been proposed for use in expendable linings for tundishes but have been used little in practice. Refractory silicates, for example, have been proposed but have usually been dismissed as offering no advantage over silica itself and as suffering from the disadvantages that apply to silica in certain circumstances. Olivine, for example, has been regarded as being insufficiently refractory for use by itself in many instances.

Whilst slabs based on calcined magnesite perform well under certain conditions, they are not very suitable for use in contact with acidic slags i.e. containing high proportions of silica as reactions take place leading to the formation of low melting phases. Silica-based slabs can be used with acidic slags but are more readily attacked if the slag has a high manganese oxide content e.g. 7%, as is typically the case if the metal being cast is a high manganese steel e.g. containing 1.2% of manganese.

According to the present invention a method of continuously casting a high manganese steel comprises pouring the steel into a continuous casting mould via a tundish having an inner, expendable refractory, heat-insulating lining comprising particulate zircon and a binder.

By virtue of its composition, the inner lining of the tundish used in the method of the invention can be made to have good resistance to erosion by slags of high manganese oxide content and to acidic slags in general. Moreover, together with the erosion resistance, satisfactory hot strength and thermal insulation properties can be achieved. Zircon (zirconium silicate) dissociates at a significant rate at temperatures above 1500° C. such as are encountered in tundishes for the continuous casting of steel. The zircon dissociates into zirconium oxide and silica and the resistance of the lining to erosion by slags of high manganese oxide content is therefore surprising. On dissociation, zircon expands by about 9% by volume but linings according to the invention can be made that satisfactorily retain their integrity in use despite the phenomenon.

The inner lining of the tundish used in the method preferable comprise 75 to 95% by weight of refractory filler and preferably at least half of this is zircon. If a refractory filler in addition to zircon is present, the additional filler is preferably calcined bauxite.

According to a further aspect of the invention a molten metal handling vessel has an inner, expendable refractory, heat-insulating lining comprising particulate zircon, calcined bauxite and a binder.

It is preferred that no refractory filler other than zircon and calcined bauxite should be present in the inner lining or that the amount of any further filler should be low e.g. less than 10% by weight. The presence of calcined bauxite is beneficial in that it enhances the ability of the lining to withstand erosion, especially by high manganese oxide content slags and is particularly useful for this effect in tundish linings subject to high operating temperatures e.g. where the temperature of steel in the tundish is at least 1500° C. e.g. 1575° C. The weight ratio of zircon to calcined bauxite in the linings is preferably in the range of 3:1 to 1:1, most preferably about 2:1.

In accordance with the invention it has been found that the presence of zircon and calcined bauxite together enables linings having enhanced erosion resistance to be achieved compared with linings containing only one of zircon and bauxite.

It is thought that, in the case of high temperatures, the enhanced erosion resistance may arise because of reaction of alumina in the calcined bauxite with silica, formed by dissociation of the zircon, to form secondary mullite.

The lining contains a binder and this may be organic and/or inorganic. Examples of suitable organic binders are starch and resins e.g. phenol-formaldehyde and urea-formaldehyde resins. Examples of suitable inorganic binders are silicate binders, phosphate binders, colloidal silica sol, colloidal alumina sol, hydraulic and refractory cements and bonding clays such as ball clay and bentonite. Preferred inorganic binders are alkali metal silicates that are substantially water-insoluble at normal ambient temperatures e.g. 20° C. but have a substantial solubility in water at temperatures of about 100° C. Preferably the silicate is a sodium silicate and prferably the $SiO_2:Na_2O$ weight ratio is in the range of 3.0:1 to 3.8:1. It is particularly preferred that both an organic binder and an inorganic binder should be present, the inorganic binder preferably being an alkali metal silicate as described above.

The total amount of binder present is preferably in the range of 2 to 20% by weight, more preferably 3 to 15%, the amount of any organic binder preferably being from 2 to 6% by weight and the amount of any inorganic binder preferably being from 3 to 8% by weight.

If an inorganic binder is used alone, the amount is preferably from 5 to 20% by weight.

The lining preferably contains fibre and this may be organic and/or inorganic. The total amount of fibre is preferably from 2 to 8% by weight, the amount of any organic fibre preferably not exceeding 4% and the amount of any inorganic fibre preferably being in the range of 1 to 4% by weight. Suitable organic fibres include paper, hemp, jute, synthetic fibres e.g. polyester and acrylic fibres and semi-synthetic fibres e.g. rayon and examples of suitable inorganic fibre are refractory fibres, such as aluminosilicate fibres, rockwool and slagwool, and glass fibre.

The features described above of the inner lining of a vessel of the invention are especially valuable if the vessel is a tundish and the features are particularly applicable to a tundish used in the method of the invention.

Linings in accordance with the invention are preferably provided by fitting a set of pre-formed, refractory, heat-insulating articles comprising the ingredients in question and, according to a further aspect of the invention, a shaped, refractory, heat-insulating article for use in an inner, expendable lining of a molten metal handling vessel comprises particulate zircon, calcined bauxite and a binder. The articles e.g. slabs or boards can conveniently be made by a slurry-forming technique i.e. an aqueous slurry of the ingredients is de-watered in a suitably shaped permeable mould and the product then heated to dry it and render the binder effective.

Alternatively, the linings may be formed in situ e.g. by ramming, spraying or trowelling of a suitable composition. In such cases a proportion of water may be included in the composition to provide the required consistency for a rammable, sprayable or trowellable composition. Generally, it has been found that 15% to 25% of water is preferred for spraying, 10% to 15% for trowelling and from about 5% to 10% for ramming. This water may be removed after forming by drying the lining in air or an external heat source. Alternatively, the water may be evaporated by means of residual heat retained by the permanent refractory lining of the vessel from a previous use.

The ingredients for the linings and the method of making them are preferably so chosen that the linings have a density of the range of 1.5 to 2.5 g/cm$^3$. In the case of sprayed linings it has been found beneficial to include up to 5% by weight of a lightweight refractory filler material such as bubble alumina microspheres, hollow silica microspheres, calcined rice husks or expanded fireclay grog.

The presence of lightweight refractory filler material has been found to enhance the flowability of the lining composition during its application by spraying.

The invention is illustrated by the following Examples.

EXAMPLE 1

The following ingredients in the percentages (by weight) specified were formed into an aqueous slurry:

| Ingredient | % |
| --- | --- |
| zircon | 57.2 |
| calcined bauxite (alumina content at least 85%) | 31.75 |
| slagwool | 3 |
| paper | 3 |
| phenol-formaldehyde resin | 3 |
| urea-formaldehyde resin | 1.5 |
| glass fibre | 0.5 |
| suspension aid | 0.05 |

The slurry was de-watered in a permeable mould shaped to form a slab and the damp slab removed and heated to dry it and to set the binders. The resultant slab had a density of 1.6 g/cm$^3$ and was suitable for use in the expendable, inner lining of a tundish for continuous casting of high manganese steel associated with an acidic, high manganese oxide content slag and with a tundish steel temperature of about 1575° C.

EXAMPLE 2

The following ingredients in the percentages (by weight) specified were formed into an aqueous slurry:

| Ingredient | % |
| --- | --- |
| zircon | 55.2 |
| calcined bauxite (alumina content at least 85%) | 30.75 |
| slagwool | 2.5 |
| paper | 1.5 |
| phenol-formaldehyde resin | 3 |
| urea-formaldehyde resin | 1.5 |
| glass fibre | 0.5 |
| suspension aid | 0.05 |
| sodium silicate (SiO$_2$:Na$_2$O weight ratio of 3.3:1) | 5 |

The slurry was formed into a slab as in Example 1 and had generally similar properties but enhanced hot strength and a density of 1.7 g/cm$^3$.

EXAMPLE 3

The following ingredients in the percentages (by weight) specified were sprayed onto the permanent refractory lining of a ladle to form an inner expendable refractory, heat-insulating lining.

| Ingredient | % |
| --- | --- |
| zircon | 55.20 |
| calcined bauxite (alumina content at least 85%) | 30.75 |
| polyester fibre | 0.05 |
| phenol-formaldehyde resin | 3.00 |
| sodium silicate (SiO$_2$:Na$_2$O weight ratio of 3.3:1) | 5.00 |
| bubble alumina microspheres | 3.00 |
| fireclay | 3.00 |

The composition was formed into a sprayable consistency by the addition of approximately 20% by water and sprayed onto a pre-heated permanent ladle lining to a thickness of 25 mm. The performance of the in situ sprayed lining was similar to that obtained for Example 1.

The density of the sprayed lining was 1.9 g/cm$^3$.

I claim:

1. A shaped, refractory, heat-insulating article for use in an inner, expendable lining of a molten metal handling vessel comprising particulate zircon, calcined bauxite and a binder, wherein the weight ratio of zircon to calcined bauxite is in the range of 3:1 to 1:1.

2. A shaped, refractory, heat-insulating article for use in an inner, expendable lining of a molten metal handling vessel comprising particulate zircon, calcined bauxite and a binder, the binder comprising an organic binder selected from the group consisting of one or more of urea-formaldehyde resin, phenol-formaldehyde resin, and starch.

3. An article according to claim 2 wherein the organic binder comprises 2–6% by weight of the article.

4. A shaped, refractory, heat-insulating article for use in an inner, expendable lining of a molten metal handling vessel comprising particulate zircon, calcined bauxite and a binder, the binder comprising an inorganic binder which is an alkali metal silicate having a weight ratio of $SiO_2:Na_2O$ in the range of 3.0:1 to 3.8:1.

5. An article according to claim 4 wherein the inorganic binder comprises 5 to 20% by weight of the article.

* * * * *